(12) United States Patent
Radominski et al.

(10) Patent No.: US 6,943,933 B2
(45) Date of Patent: Sep. 13, 2005

(54) MEM DEVICES HAVING CHARGE INDUCED VIA FOCUSED BEAM TO ENTER DIFFERENT STATES

(75) Inventors: George Radominski, Corvallis, OR (US); Robert W. Shreeve, Corvallis, OR (US); Harold Lee Van Nice, Corvallis, OR (US); Steve P. Hanson, Albany, OR (US); Timothy R Emery, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/743,603

(22) Filed: Dec. 21, 2003

(65) Prior Publication Data

US 2005/0134957 A1 Jun. 23, 2005

(51) Int. Cl.[7] .......... G02B 26/00; G02B 26/08; G03G 16/00; G02F 1/00; H01J 29/12
(52) U.S. Cl. .......... 359/293; 359/291; 359/224; 430/50; 348/771; 348/772; 348/782; 313/465; 313/149; 438/478
(58) Field of Search .......... 359/290, 291, 359/293, 292, 224, 262; 348/771, 772, 775, 782; 430/50; 438/478; 313/465, 149, 367, 397

(56) References Cited

U.S. PATENT DOCUMENTS

| | | | |
|---|---|---|---|
| 2,681,423 A | 6/1954 | Auphon | |
| 2,682,020 A | 6/1954 | Johnson | |
| 2,733,501 A | 2/1956 | Orthuber et al. | |
| 3,319,105 A | * 5/1967 | Koda et al. | 313/149 |
| 3,517,126 A | * 6/1970 | Sano et al. | 348/772 |
| 3,667,830 A | 6/1972 | Rottmiller | |
| 3,676,588 A | * 7/1972 | Kozol et al. | 348/772 |
| 3,746,911 A | 7/1973 | Nathanson et al. | |
| 3,886,310 A | 5/1975 | Goldberg et al. | |
| 4,065,308 A | * 12/1977 | Bergen | 430/50 |
| 5,216,537 A | 6/1993 | Hornbeck | |
| 5,287,215 A | 2/1994 | Warde et al. | |
| 5,471,341 A | * 11/1995 | Warde et al. | 359/293 |
| 5,822,110 A | 10/1998 | Dabbaj | |
| 5,926,309 A | 7/1999 | Little | |
| 6,028,696 A | 2/2000 | Robinson et al. | |
| 6,130,770 A | 10/2000 | Bloom | |
| 2004/0033679 A1 | * 2/2004 | Jacobson et al. | 438/510 |

* cited by examiner

Primary Examiner—Loha Ben

(57) ABSTRACT

An apparatus of one embodiment of the invention is disclosed that includes a number of micro-electromechanical (MEM) devices, a charge source, and at least one discharge path. Each MEM device has a plurality of different states based on a charge induced thereon. The charge source is to induce the charge thereon such that the MEM devices each enter one of the states. The at least one discharge path is for the plurality of MEM devices, and along which the charge induced thereon is dischargeable.

61 Claims, 9 Drawing Sheets

MEM DEVICES HAVING CHARGE INDUCED VIA FOCUSED BEAM TO ENTER DIFFERENT STATES

BACKGROUND OF THE INVENTION

Projection-type display devices are generally devices that integrate light sources, optics systems, electronics, and other components for projecting data such as images, video, documents, and spreadsheets from computers or video devices onto walls or front or rear screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

Some projection-type display devices rely on digital micromirror devices (DMD's). Each DMD may correspond to a pixel or a sub-pixel of the display device. A DMD works by reflecting light in accordance with its corresponding pixel or sub-pixel, so that the pixel or sub-pixel is properly projected by the display device. However, DMD's usually need to be refreshed at very fast rates in order for the resulting display device to work properly. This can induce significant stress on the DMD's, causing them to prematurely fail.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Projection-Type Display Device

Figure 1:
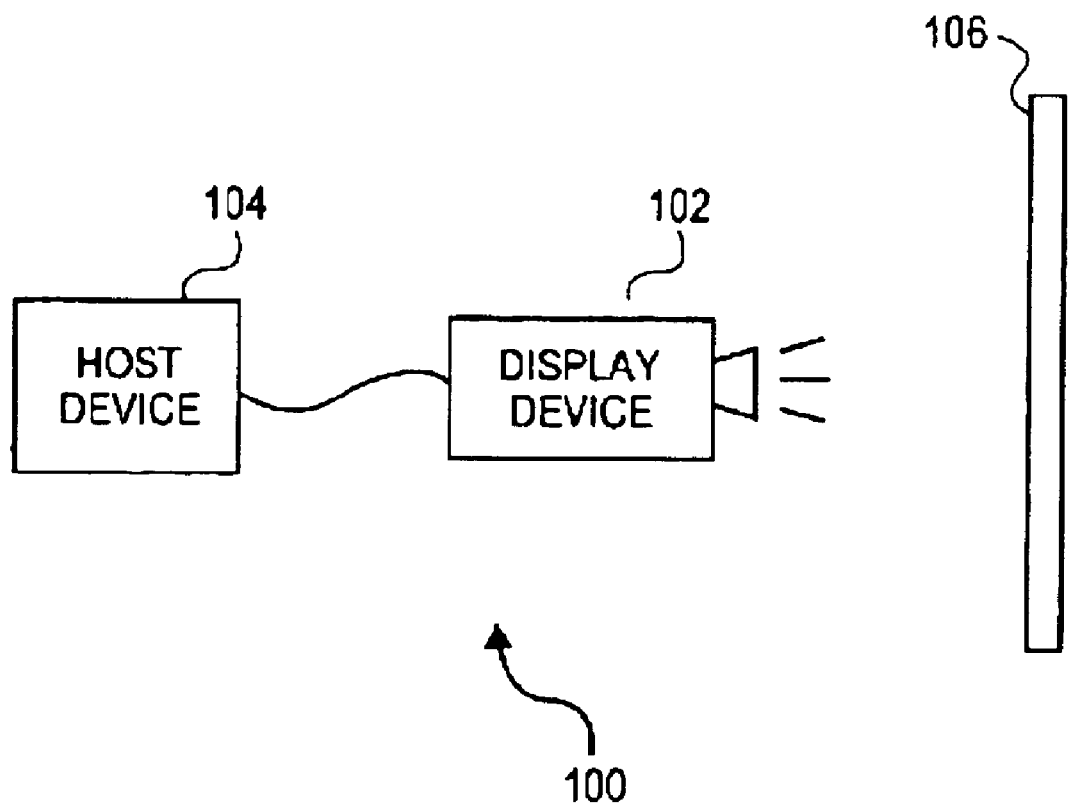
FIG. 1 is a diagram of a rudimentary system, according to an embodiment of the invention.

FIG. 1 shows a rudimentary system 100, according to an embodiment of the invention. The system 100 includes a projection-type display device 102, a host device 104, and a screen 106. The display device 102 receives display information from the host device 104. The display information may include grayscale or color values for each of a number of pixels to be displayed. For instance, in one embodiment, the display information may include intensity values for a red sub-pixel, a green sub-pixel, and a blue sub-pixel, for each pixel to be displayed. The host device 104 may be a laptop or a desktop computing device, or another type of device that is capable of supplying display information to the display device 102. The display device 102 projects images onto the screen 106 in accordance with the display information received from the host device 104. The screen 106 may alternatively be a different type of background against which images may be projected, such as a wall of a room, a whiteboard, and so on.

Figure 2A:
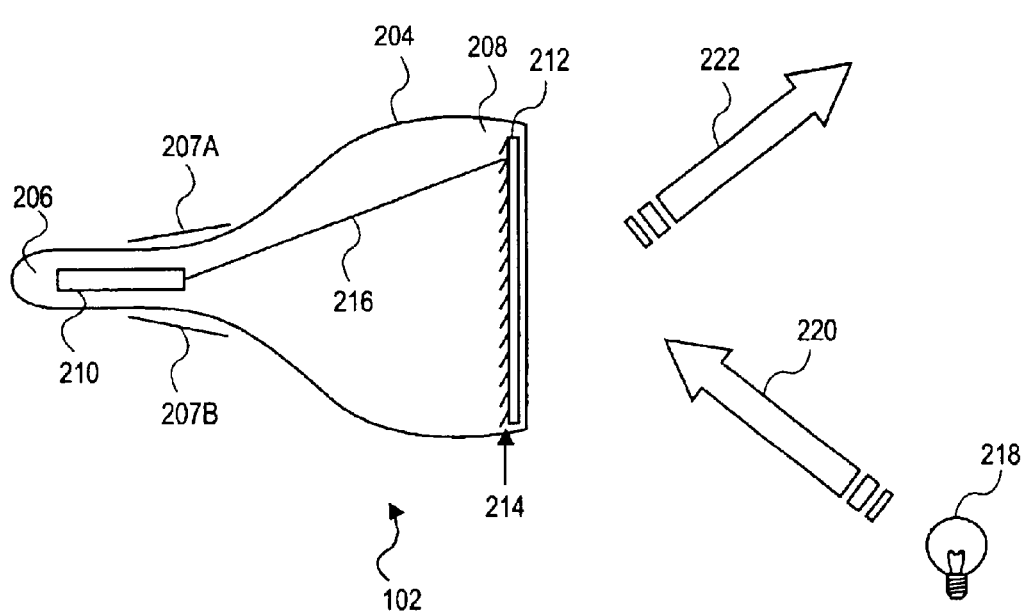
FIGS. 2A and 2B are diagrams of projection-type display devices, according to varying embodiments of the invention.

FIG. 2A shows the projection-type display device 102, according to an embodiment of the invention. The display device 102 includes a cathode-ray tube 204, a focused electron beam source 210, a plate 212, display elements 214, and one or more light sources 218. The cathode-ray tube 204 is a vacuum tube having a tapered end 206 and a wide end 208. The focused electron beam source 210 is situated at the tapered end 206, whereas the plate 212 is situated at the wide end 208. The display elements 214 are disposed against the plate 212, facing the focused beam source 210. One side of the plate 212 thus faces the focused beam source 210, whereas another side of the plate 212 faces outward therefrom.

The focused electron beam source 210 is more generally a focused beam source that may generate a beam other than an electron beam. The focused beam is a charge-creating beam. Most generally, the focused beam source 210 is a charge source. The focused electron beam source 210 generates a focused electron beam 216, that is individually scanned over the display elements 214, in accordance with display information received from the host device 104 of FIG. 1. As is described in more detail later in the detailed description, the focused electron beam 216 causes secondary electrons to be emitted from the display elements 214, by bombarding the display elements 214 with primary electrons. The charges on the display elements 214 interact with the charge on the plate 212 to cause the elements 214 to enter different display states, based on the display information.

The display elements 214 can be micro-electromechanical (MEM) devices. The light sources 218 may be incandescent light bulbs, halide light bulbs, or other types of light sources. The light sources 218 project light 220 against the display elements 214, which in one particular embodiment is reflected, but that can also be refracted, and/or transmitted as the light 222, to result in the displayed image on the screen 106 of FIG. 1. The light 220 is projected from outside the cathode-ray tube 204, and is reflected off the display elements 214 as the light 222. The plate 212 may be held at a constant voltage, such as common or ground.

The focused beam 216 is positionable (i.e., scannable) over the display elements 214 due to the presence of deflecting plates 207A and 207B, which are collectively referred to as the deflecting plates 207. The deflecting plates 207 vary in charge over time during a given frame, so that during that frame the focused beam 216 is caused to scan over all of the display elements 214. The plates 207 may be electrostatic or electromagnetic deflecting plates. The number of electrons generated by the focused beam source 210, where the beam source 210 is an electron beam source, may be dependent on the type of filament that is used as the beam source 210. Furthermore, the energy induced by the deflecting plates 207 depends on their position relative to the tube 204.

Figure 2B:
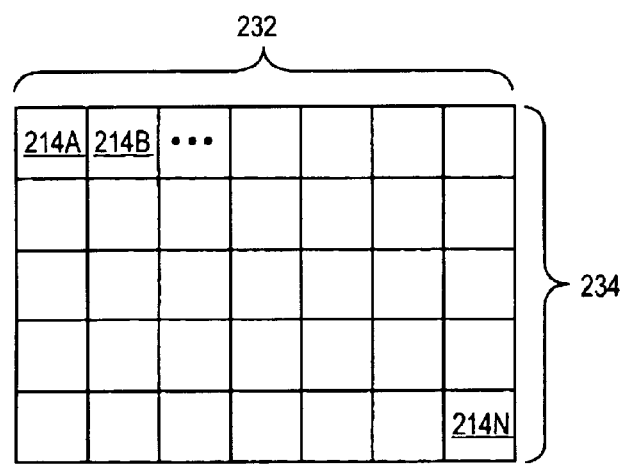
Figure 2B:
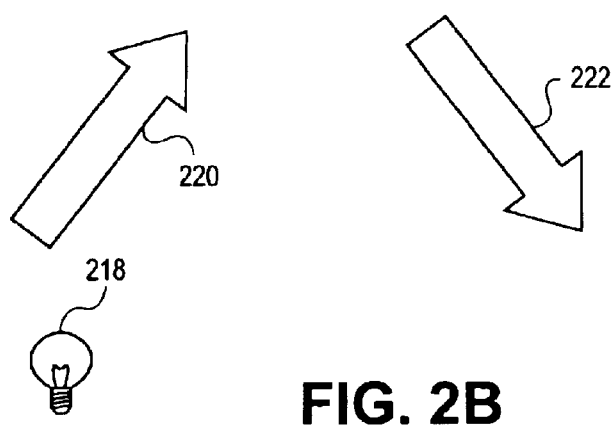

FIG. 2B shows how the light 220 projected from the light sources 218 is reflected, refracted, and/or transmitted off the display elements 214, to result in the light 222, according to one embodiment of the invention. The display elements 214 are specifically depicted as the display elements 214A, 214C, . . . , 214N, organized into columns 232 and rows 234. FIG. 2B specifically illustrates the situation where the light 220 projected from the one or more light sources 218 is reflected, refracted, and/or transmitted off all the display elements 214, resulting in the light 222. As such, the light sources 218 may include a single light source projecting the light 220 that is white light. In this embodiment, each of the display elements 214 may correspond to one pixel of the display information.

Furthermore, the focused electron beam 216 is able to individually scan the display elements 214, such that each of the display elements 214 may be individually bombarded with a different number of electrons by the focused beam 216. For instance, the display elements 214 of the first row of the rows 234 are individually scanned from the left column of the columns 232 to the right column of the columns 232, then the elements 214 of the second row of the rows 234 are individually scanned from the left column of the columns 232 to the right column of the columns 232, and so on. A frame of the display information may result in the individual scanning of the display elements 214 in this manner one or more times.

Display Elements

Figure 3:
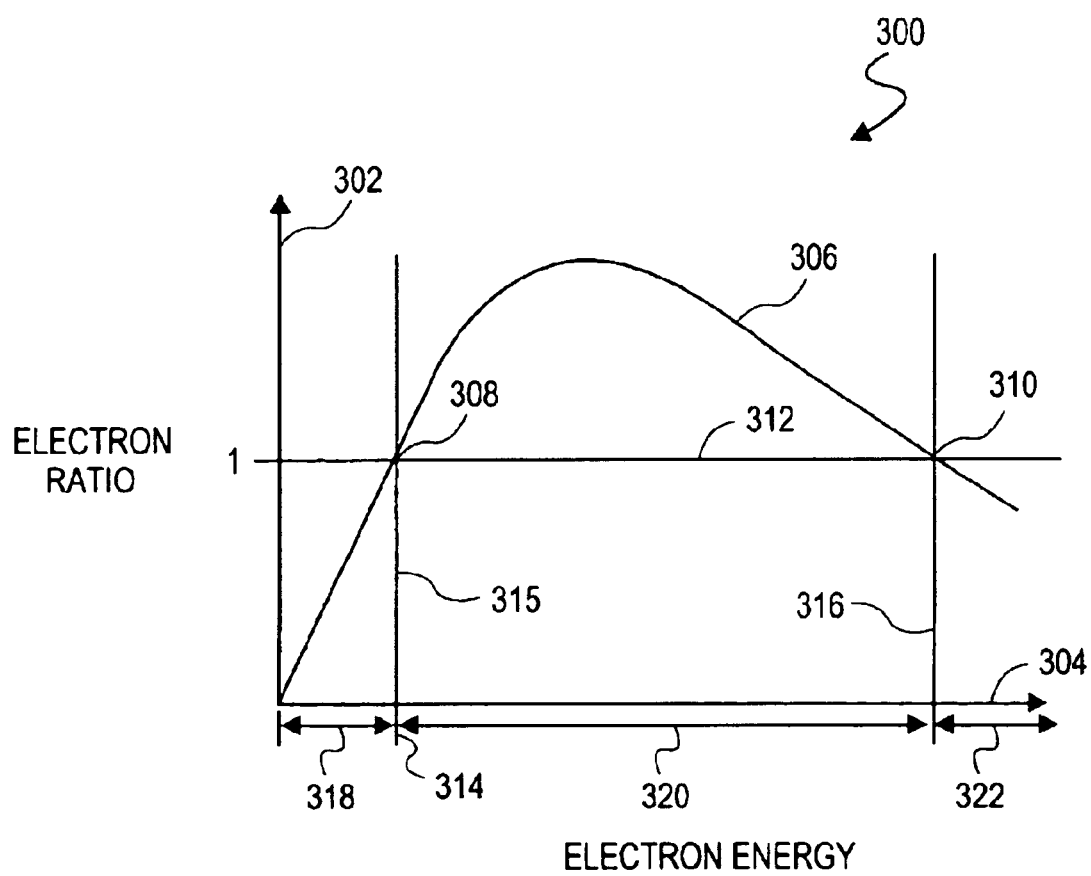
FIG. 3 is a graph depicting the physics by which display elements operate, according to an embodiment of the invention.

FIG. 3 shows a graph 300 that illustrates the physics by which display elements operate, according to an embodiment of the invention. The y-axis 302 is a ratio of the number of electrons leaving the surface of a given display element, which are secondary electrons, divided by the number of electrons bombarding the surface of the display element by an electron beam, which are primary electrons. The x-axis 304 is a measure of the electron energy of the electron beam bombarding the display element. On the y-axis 302, a ratio of one, indicated by the line 312, is when the number of electrons leaving the surface of the display element equals the number of electrons bombarding the surface of the display element.

The line 306 indicates this ratio on the y-axis 302 as the electron energy is increased on the x-axis 304. As the energy increases, the ratio increases within the region 318 demarcated by the y-axis 302 and the vertical line 315. Within the region 318, the display element is charged negative, because the ratio is less than one, corresponding to fewer electrons leaving the display element than electrons bombarding the element. At the point 308, the ratio reaches a value of one, at which the number of electrons leaving the display element is equal to the number of electrons bombarding the element. As the electron energy continues to increase, the ratio increases and then decreases within the region 320 demarcated by the vertical lines 315 and 316. Within the region 320, the display element is charged positive, because the ratio is greater than one, corresponding to more electrons leaving the display element than electrons bombarding the element. At the point 310, the ratio again reaches a value of one, at which the number of electrons leaving the display element is equal to the number of electrons bombarding the element. As the electron energy continues to increase, the ratio decreases within the region 322 demarcated by the vertical line 316. Within the region 322, the display element is again charged negative, because the ratio is less than one.

The points 308 and 310 are referred to as crossovers, where the point 308 is the first crossover, and the point 310 is the second crossover. The first crossover is within an unstable region, because the surface of the display element tends not to remain charged at a given electrostatic potential at the point 308. By comparison, the second crossover is within a stable region, because the surface of the display element tends to remain charged at the given electrostatic potential at the point 310. Once the display element has entered the region in which the point 310 lies by bombarding electrons from a focused electron beam, a flood electron beam may then be employed to maintain the display element within this region. Thus, by controlling the value of the ratio of electrons leaving the display element to electrons bombarding the element, the display element may be charged either positive or negative, and may be maintained at the point 310. The value of the ratio depends on the composition of the surface of the display element, the surface area of this surface, as well as the energy of the bombarding electrons.

More generally, the display element is charged via the focused beam inducing a charge on the display element. In one embodiment, a negative or a positive charge is induced on the display element, and an opposite mirror charge is induced on the plate against which the display element is disposed. Thus, if a negative charge is induced on the display element, a positive charge is induced on the plate, and vice-versa. As a result, the display element has an attractive force towards the plate. In another embodiment, the same type of charge, positive or negative, is induced on both the display element and the plate. In this embodiment, the display element has a repelling force away from the plate.

In at least some embodiments of the invention, the charge induced on a display element via the focused beam is proportional to the length of time that the beam scans the display element. That is, the longer the beam focuses on a given display element, the greater the charge that is induced on the display element. This allows different display elements to have different charges induced thereon by the focused beam.

Furthermore, whereas FIG. 3 has been described as primary electrons from the focused beam causing secondary electrons to be emitted from the display element, in another embodiment, the primary electrons charge the display element, and no secondary electrons are lost. That is, the focused beam source is a focused primary beam source, and emits primary electrons that are placed on the display element. Other types of higher and lower energy electrons may also be employed to induce a charge on the display element via the focused electron beam. Furthermore, other types of charging mechanisms, besides electrons of a focused electron beam, can be used to induce a charge on the display element. However, the emission of secondary electrons from the display element allows for more dense packing of the display elements. This is because a narrower focused beam, and thus a smaller beam spot size, is needed to cause secondary electrons to be emitted from any given element, such that the display elements may be packed more closely together.

Figure 4A:
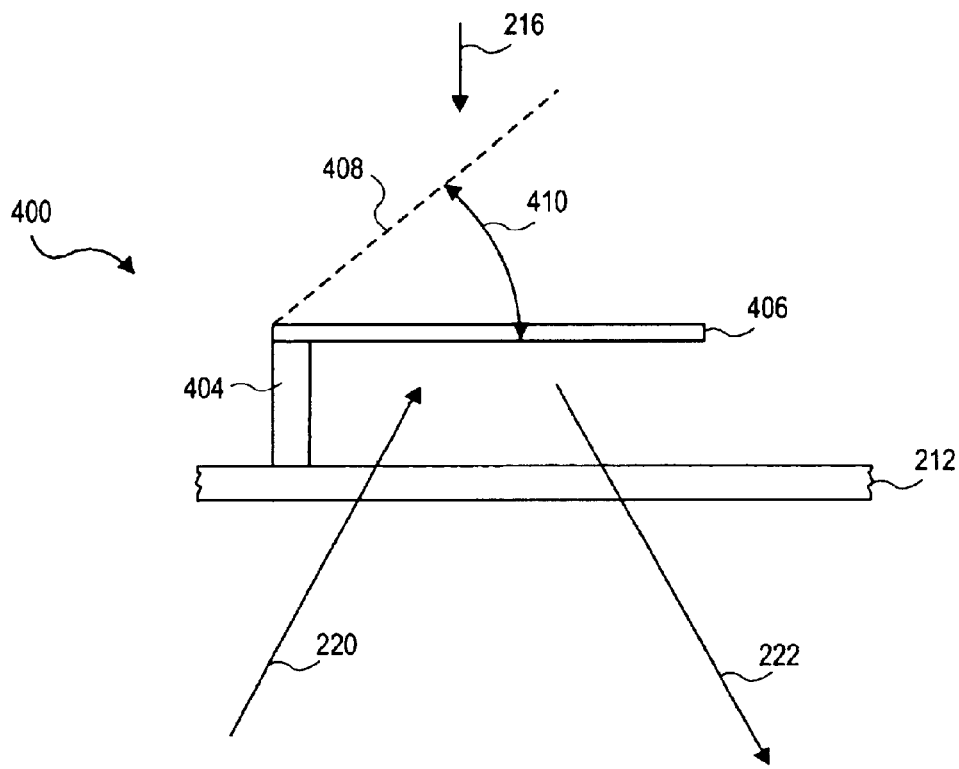
FIG. 4A is a diagram of a display element, according to an embodiment of the invention.

FIG. 4A shows a display element 400, according to an embodiment of the invention. The display element 400 is specifically a hinged mirror-type display element, including a reflective membrane 406 that functions as a hinged mirror. The display element 400 is situated against the plate 212, and includes a support 404 that is at least substantially perpendicular to the plate 212. The reflective membrane 406 may be aluminum, the support 404 may be silicon dioxide, or silicon oxide. The support 404 is mounted between one end of the plate 212 and one end of the reflective membrane 406. The display element 400 may be used to implement each of at least one of the display elements 214 that have been described. As depicted in and described in relation to FIG. 4A, the display element 400 is a microelectromechanical (MEM) device, in that it is small, and hence micro, moves, and hence mechanical, and is chargeable, and hence electrical.

The focused electron beam 216 bombards the reflective membrane 406 with primary electrons, and thus causes the reflective membrane 406 to emit secondary electrons as has been described in conjunction with the graph 300 of FIG. 3. As a result, the reflective membrane 406 becomes charged positive or negative. Where the plate 212 also has a charge, this means that the reflective membrane 406 is able to rotate from the position at which it is shown in FIG. 4A, to the position 408, and potentially any position in-between, as indicated by the bi-directional arrow 410. At the position 408, and any position between the position at which the membrane 406 is shown in FIG. 4A, as indicated by the arrow 410, the membrane 406 is non-parallel to the plate 212 and non-perpendicular to the support 404. The ultimate charge on the membrane 406 interacts with the charge on the plate 212, such that the membrane 406 is repelled by the plate 212 to cause it to move to one of the positions between the position in which it is shown in FIG. 4A, to the position 408, as indicated by the bidirectional arrow 410.

The reflective membrane 406 is able to reflect the light 220 projected towards it. The amount and/or direction of the light 220 reflected by the membrane 406 as the light 222 depends on the position of the reflective membrane 406 as has been described. Therefore, it is said that the reflective membrane 406 is able to enter one of a number of different display states, depending on the number of secondary electrons that have been emitted thereby resulting from the focused electron beam 216. For instance, the intensity of the light that is emitted along the vector of the light 222 in FIG. 4A may vary based on the position of the reflective membrane 406, and hence the display state of the display element 400. That is, the angle of reflection of the hinged mirror— viz., the reflective membrane 406—is capable of controlling the intensity of the light reflected by the hinged mirror along the vector of the light 222 in FIG. 4A.

In one embodiment, the default, or off, state of the display element 400 is where the reflective membrane 406 is in the position depicted in FIG. 4A, such that the membrane 406 is parallel to the plate 212. The emission of secondary electrons from the reflective membrane 406 therefore causes the membrane 406 to be repulsively charged and tilt away from the plate 212, so that the display element 400 enters a different display state. In one embodiment, there may be just two display states, the default, or off, state, and an activated, or on, display state corresponding to the reflective membrane 406 completely tilting away from the plate 212 at the position 408. In another embodiment, there may be more than two display states, the default state, and a number of activated display states, where each of these activated display states corresponds to the reflective membrane 406 tilting away from the plate 212 at a different angle. Each display state corresponds to the display element 400 differently reflecting the projected light 220, to result in a different intensity of the light 222 along the vector of the light 222 as indicated in FIG. 4A.

Furthermore, in one embodiment, the emission of secondary electrons from the reflective membrane 406 may cause the membrane 406 to be attractively charged and tilt towards the plate 212. The default state of the display element 400 may still be where the reflective membrane 406 is parallel to the plate 212, where, for instance, the default state of display element 400 is maintained by appropriately bombarding the reflective membrane 406 by electrons. Thus, the reflective membrane 406 may be positively or negatively charged, where the plate 212 may itself be positively or negatively charged. As a result, the membrane 406 may be attracted to or repulsed away from the plate 212 upon emitting secondary electrons. The membrane 406 may switch between just a default position in which it is depicted in FIG. 4A to and from the position 408, such that the display element 400 has two display states. Alternatively, the membrane 406 may be maintained at different positions between the default position and the position 408, such that the display element 400 has more than two display states, such that the activated display states include the display states in which the element 400 partially to fully tilts away from the plate 212.

In addition, the plate 212 is depicted in FIG. 4A, and has been described thus far, as being common to all the display elements, including the display element 400 of FIG. 4A. Alternatively, however, there may be an electronically disconnected plate for each display element. That is, each display element has a corresponding plate that is not electrically connected to any plate of any other display element. Furthermore, there may be an oxide layer over the plate 212 that acts as the discharge layer, which may generally be referred to as a discharge path.

The embodiment of FIG. 4A has been described such that the position of the membrane 406 where it is parallel to the plate 212 is the default state of the membrane 406. Inducing a charge on the membrane 406 causes it to repel away from the plate 212. However, in another embodiment of the invention, the position of the membrane 406 where it is in the position 408 is the default state of the membrane 406. Inducing a charge on the membrane 406 thus causes it to attract towards the plate 212. That is, a given type of charge, either positive or negative, is induced on the membrane 406, and a corresponding opposite charge, either negative or positive, is created on the plate 212, causing the membrane 406 to be attracted to the plate 212.

Figure 4B:
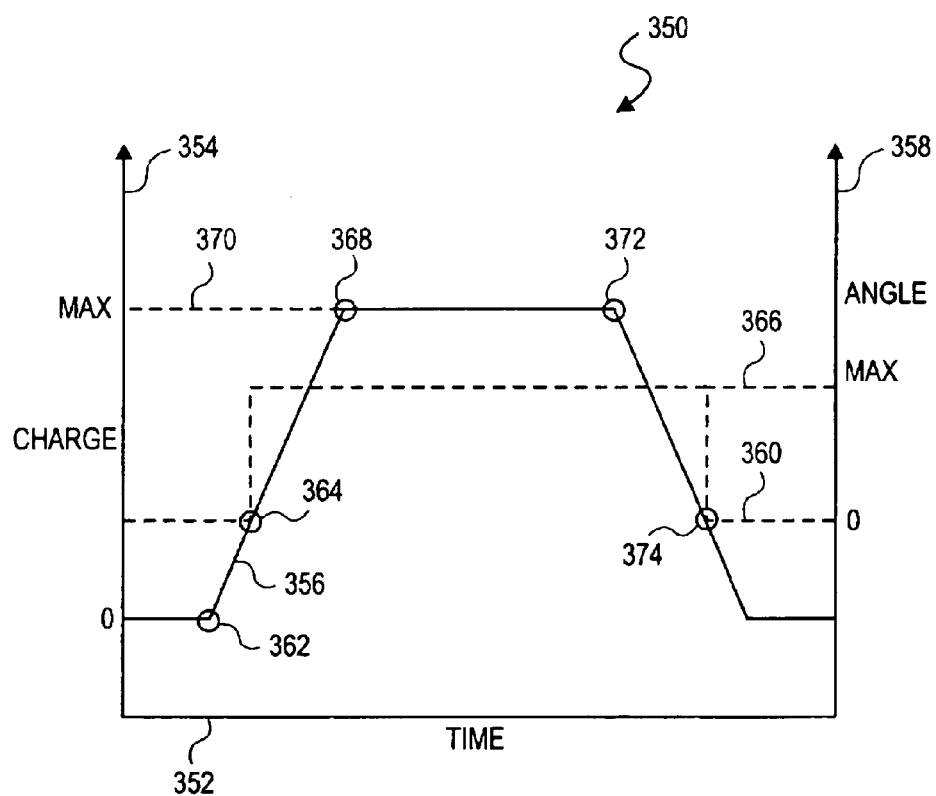
FIG. 4B is a graph of the charge induced on the display element of FIG. 4A and the deflective angle of the element of FIG. 4A as a function of time, according to an embodiment of the invention.

FIG. 4B shows a graph 350 that depicts both the charge induced on the reflective membrane 406 of the display element 400 of FIG. 4A, and the deflective angle of the membrane 406 of the element 400, over time, according to an embodiment of the invention. The x-axis 352 denotes time, whereas the y-axis 354 denotes the charge induced on the membrane 406 as indicated by the line 356, and the y-axis 358 denotes the deflective angle of the membrane 406 as indicated by the line 358. Until the point 362, the charge induced on the membrane 406 is zero, and the deflective angle of the membrane 406 is also zero, corresponding to the default position of the membrane 406, as specifically depicted in FIG. 4A.

Beginning at the point 362, a focused beam is incident to the membrane 406, causing the charge induced on the membrane 406 to increase. At the point 364, sufficient charge has been induced on the membrane 406 that the membrane 406 snaps to an activated position, such that the deflective angle of the membrane 406 is at a maximum level 366. This corresponds to the membrane 406 being in the position 408 of FIG. 4A. The maximum amount of charge induced on the membrane 406 occurs at the point 368, corresponding to the level 370, at which point the focused beam is no longer incident to the reflective membrane 406.

At the point 372, the membrane 406 begins to discharge along a discharge path, and the charge stored on the membrane 406 decreases. At the point 374, there is insufficient charge to maintain the membrane 406 at its activated position, and the deflective angle of the membrane drops back to zero, corresponding to the level 360, indicating that the membrane 406 has snapped backed to a default position. It is noted that the graph 350 of FIG. 4B specifically depicts the scenario where the display element 400, and thus the reflective membrane 406 thereof, have two states or positions, a default state and an activated state. In other embodiments of the invention, the element 400, and its membrane 406, may have more than two such states or positions, as can be appreciated by those of ordinary skill within the art.

Figure 4C:
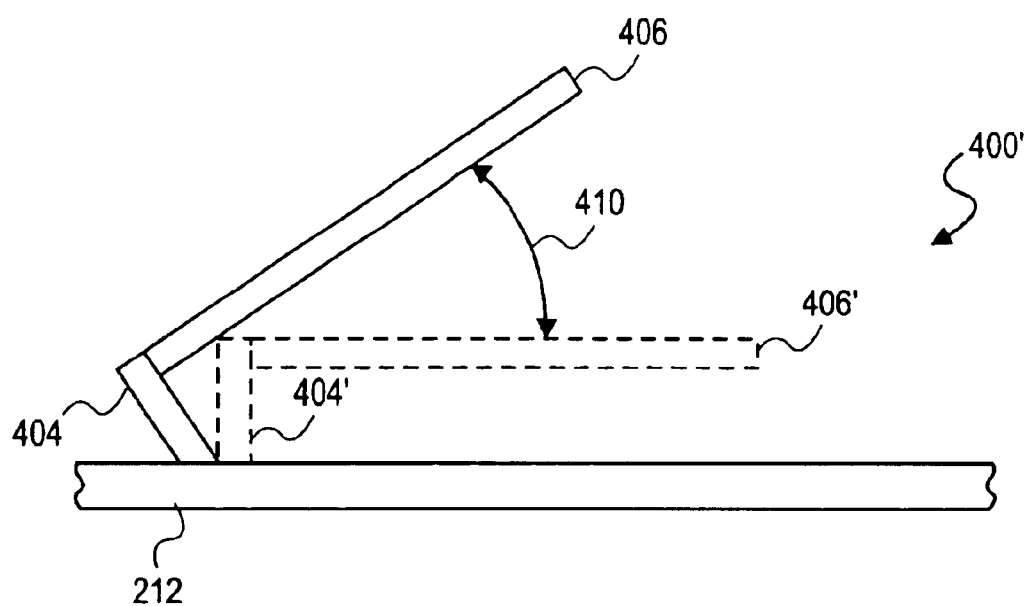
FIG. 4C is a diagram of a display element, according to another embodiment of the invention.

The embodiment of FIG. 4A has been described such that it is the membrane 406 that tilts when a charge is induced on the membrane. Alternatively, the support 404 tilts, instead of the reflective membrane 406. FIG. 4C shows a display element 400', according to an embodiment of the invention in which the support 404 tilts. The reflective membrane 406 substantially remains at a constant angle, such as a right angle, to the support 404, regardless of the charge induced on the membrane 406. Rather, the support 404 tilts in accordance with the charge induced on the membrane 406. In the diagram of FIG. 4C specifically, the support 404 is depicted as having maximally tilted, whereas the default position of the support is indicated as the position 404'. The membrane 406, due to its remaining at a constant angle relative to the support 404, therefore moves between the position in which it is specifically depicted in FIG. 4C, and the default position 406', as indicated by the arrow 410.

Methods

Figure 5A:
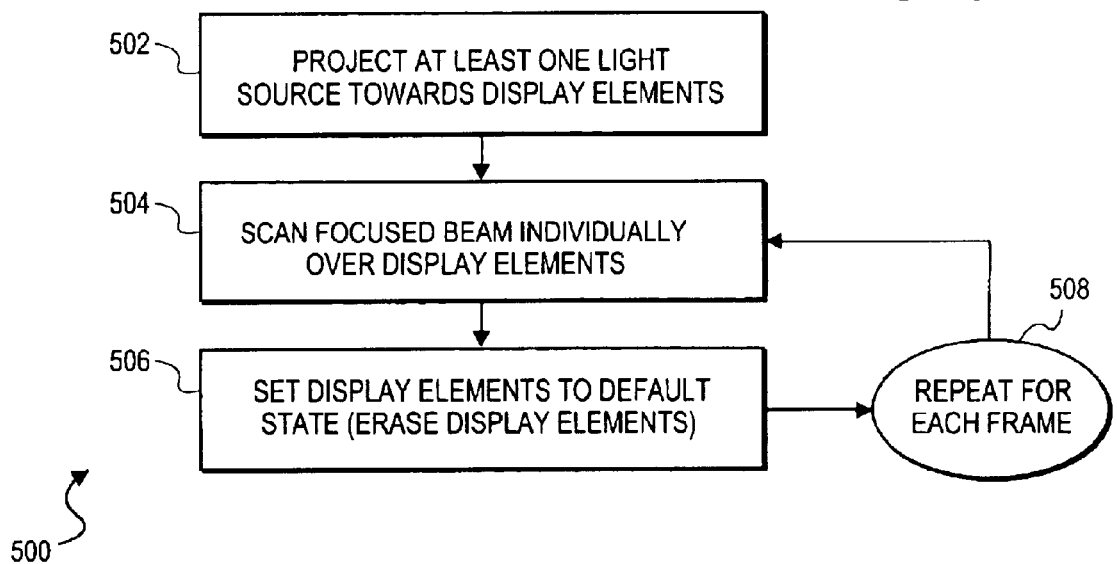
FIGS. 5A and 5B are flowcharts of methods, according to varying embodiments of the invention.

FIG. 5A shows a method of use 500, according to an embodiment of the invention. The method 500 may be performed relative to the projection-type display device 102, of one or more of FIGS. 1, 2A, and 2B, where each of the display elements 214 is implemented as the display element 400 of FIG. 4A or 4C, in one embodiment of the invention. Light 220 from the light sources 218 is projected against the display elements 214 (502). The focused electron beam 216, generated by the focused electron beam source 210, is scanned individually over the display elements 214 (504). The display elements 214 are then erased, to revert them to their default states (506). The scanning process of 504 and the erasure process of 506 are repeated for each frame of the display information (508). For example, the display information may have thirty, sixty, or a different number of frames per second, such that the processes of 504 and 506 are repeated for each of these frames, where each frame may have different color information for each of a number of pixels.

The erasure of the display elements at the end of each frame in 506 of the method 500 may be performed in a number of different ways. First, a flood beam may be generated to cause the display elements to enter their default states. A default state may be that state in which a display element is said to reflect no light, such that a maximum darkness shade of gray—i.e., black—is generated. Second, nothing may be done, where the charges stored on the display elements immediately begin to discharge through resistive elements that act as discharge paths, such that, at the end of the frame, the display elements have been substantially completely discharged. In such an embodiment, the display elements have a delay-tilt functionality, in that they tilt upon the charges being induced thereon, and then automatically return to their default states as the charges are discharged therefrom. In one particular case, the display elements tilt to the same position, and remain at that position for a length of time corresponding to the amount of charge induced thereon. The length of time at which the display elements remain tilted can correspond to the degree of grayscale achieved by the elements. Third, the focused beam 216 generated by the focused beam source 210 may be used to actuate active switches of the display elements to discharge the charges stored on them through resistive elements that act as discharge paths. Such an approach may be considered as activating these resistive elements by the focused beam 216.

Figure 5B:
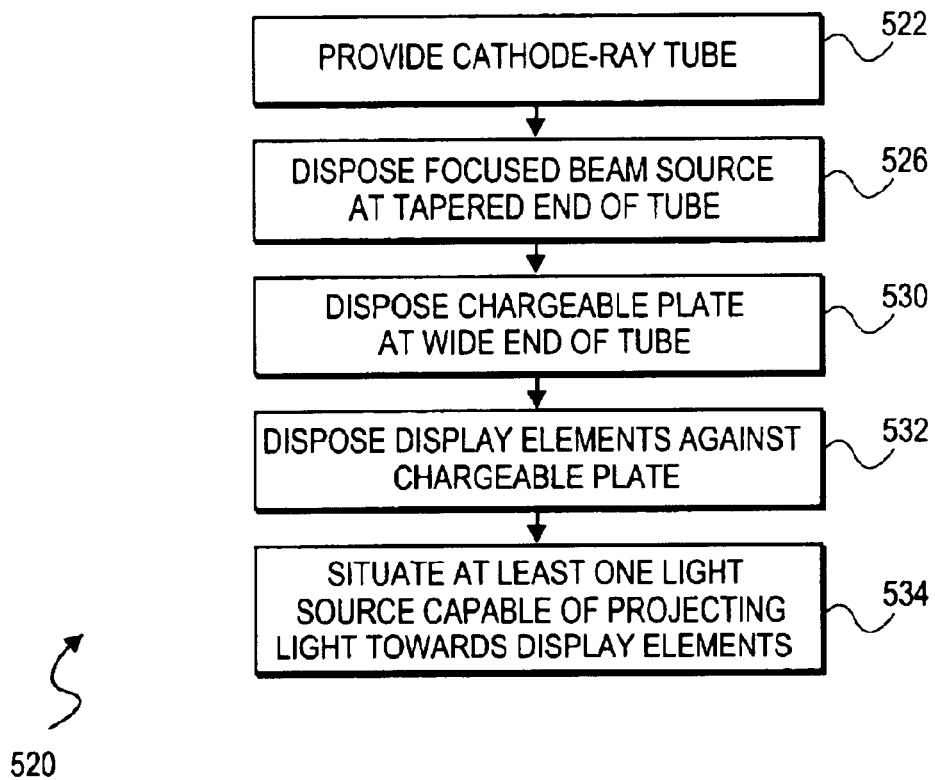

FIG. 5B shows a method 520 for manufacturing a projection-type display device, such as the display device 102 of one or more of FIGS. 1, 2A, and 2B, according to an embodiment of the invention, where the display elements 214 of the device 102 may each be implemented as the display element 400 of FIG. 4A or 4C. The cathode-ray tube 204 is provided (522) that has a wide end 208 tapering down to a tapered end 206. The focused beam source 210 is disposed at the tapered end 206 of the tube 204 (526). The plate 212 is disposed at the wide end 208 of the tube 204 (530), and display elements 214 are disposed against the plate 212 (532). The display elements 214 may each be implemented as the display element 400 of FIG. 4A or 4C. Finally, one or more light sources 218 capable of projecting light 220 towards the display elements 214 are situated (534).

Discharging Display Elements

Figure 6A:
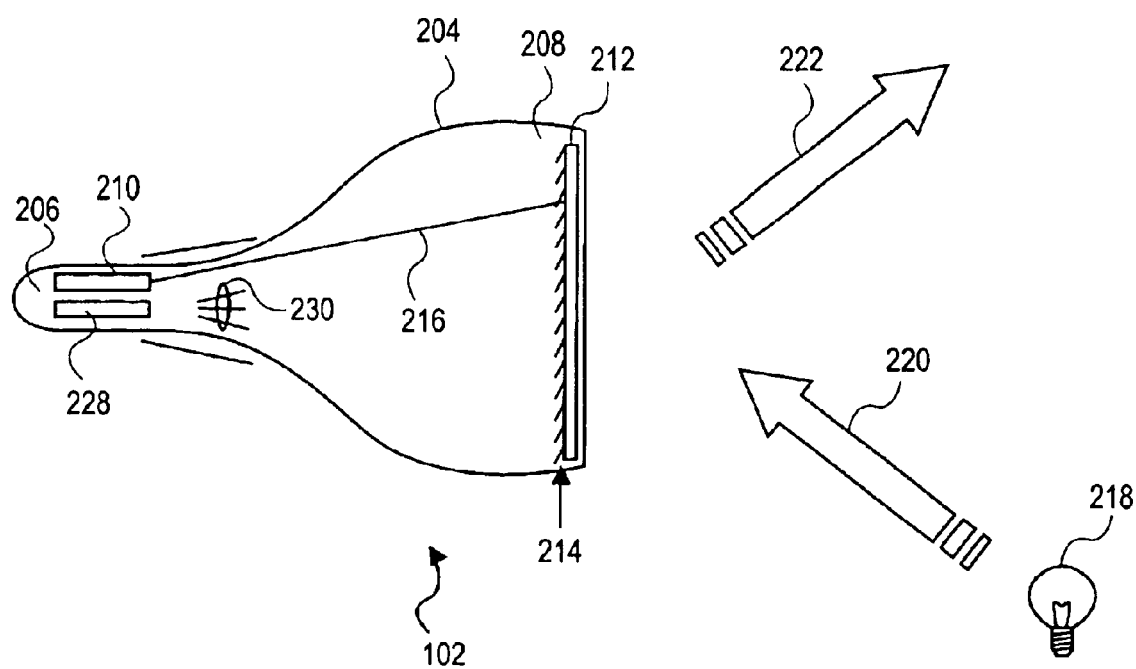
FIGS. 6A, 6B, and 6C are diagrams depicting the manner by which display elements may be discharged, according to varying embodiments of the invention.
Figure 6B:
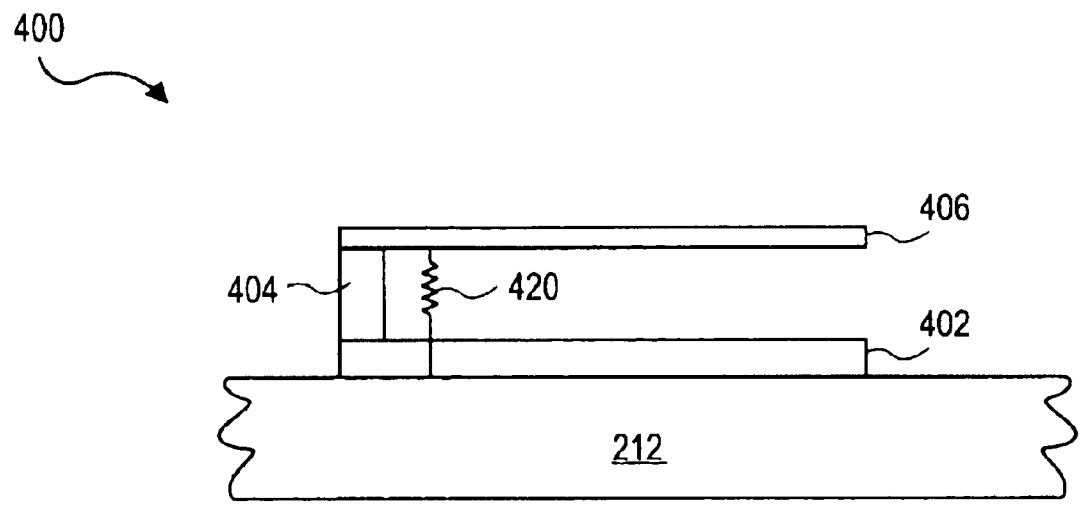
Figure 6C:
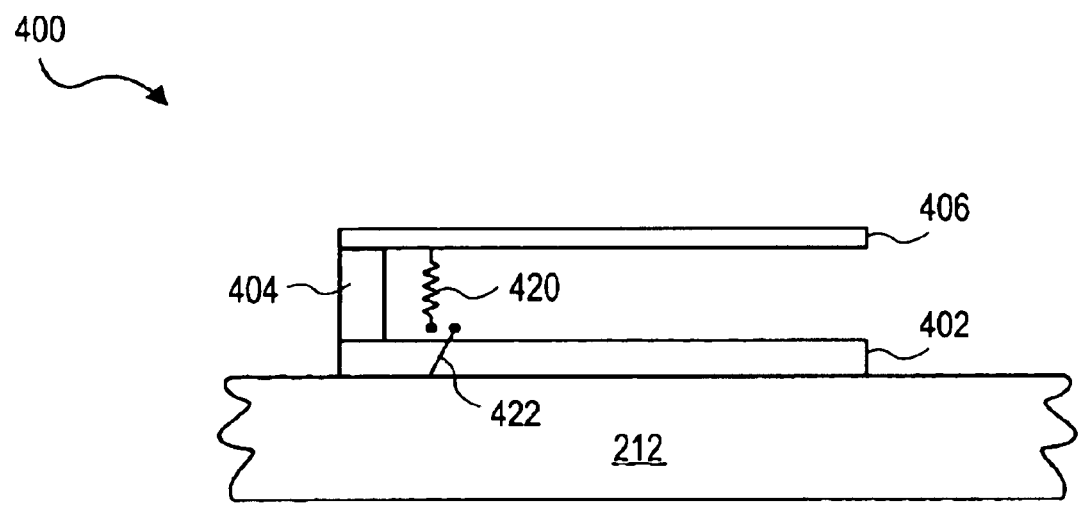

FIGS. 6A, 6B, and 6C show how display elements may be discharged, according to varying embodiments of the invention. In FIG. 6A, an additional electron beam source, the flood electron beam source 228, is situated within the cathode-ray tube 204, in addition to the focused electron beam source 210. Whereas the focused electron beam source 210 individually scans the electron beam 216 individually over the display elements 214, the flood electron beam source 228 generates a flood beam 230 that impacts all the display elements 214 at substantially the same time. Once the focused electron beam source 210 has caused the display elements 214 to individually enter display states in accordance with display information, the flood electron beam source 228 may be used at the end of a frame to cause all the elements 214 to revert to a default display state, by discharging the elements 214 through the plate 212 acting as a discharge path. The flood electron beam source 228 is more generally a flood beam source.

In FIG. 6B, the display element 400 is such that the charge on the membrane 406 thereof may be drained without using the flood electron beam 230. The display element 400, besides the substrate 402 situated against the chargeable plate 212, the support 404, and the membrane 406, includes a resistive element 420 between the membrane 406 and the chargeable plate 212. The display element 400, and specifically the membrane 406 of the element 400, electrically acts as capacitor, holding or storing a charge as placed thereon by the emission of secondary electrons resulting from the focused electron beam 216 bombarding the membrane 406 with primary electrons.

The charge is then caused to leak to the chargeable plate 212 via the resistive element 420, such that the resistance of the element 420 is selected so that the charge completely leaks to the plate 212 by the end of a frame of the display information. Leakage of the charge from the membrane 406 is similar in effect to usage of the flood electron beam 230, causing the display element 400 to revert back to the default display state. In one embodiment, the resistive element 420 is passive, and thus immediately starts to leak the charge on the membrane 406 to the chargeable plate 212 as soon as the charge is placed on, or stored by, the membrane 406. The element 420 and/or the plate 212 may act as a discharge path in this embodiment.

In FIG. 6C, the display element 400 is such that the charge on the membrane 406 thereof may be drained also without using the flood electron beam 230. Whereas the display element of FIG. 6B included the resistive element 420 between the membrane 406 and the chargeable plate 212, the display element of FIG. 6C includes the resistive element 420 and an active switch 422. Thus, whereas the charge on the membrane 406 leaks to the chargeable plate 212 automatically in FIG. 6B, leakage occurs in FIG. 6C where the switch 422 is closed, or actuated. Once the switch 422 is closed, the charge on the membrane 406 leaks through the resistor 420 to the plate 212. The value of the resistance 420 may be nominally low in FIG. 6C, because charge leakage may be desired to be substantially instantaneous, such that the membrane 406 effectively is shorted to the plate 212. It is also said that the resistive element 420 in FIG. 6C is activated when the switch 422 is closed, such as by the focused electron beam 216 causing the switch 422 to close. The element 420, the plate 212, and/or the switch 422 may act as a discharge path in this embodiment.

Alternative and More General Embodiments

Embodiments of the invention have thus far been described in relation to a projection-type display device. However, other embodiments of the invention may be implemented in conjunction with other types of apparatuses and other types of systems. For example, in a general embodiment of the invention, an apparatus may include the micro-electromechanical (MEM) devices that have been described, and a focused beam source. The MEM devices each have states based on the number of secondary electrons emitted therefrom. In the case of a display device, these states correspond to the display states that have been described. The focused beam source generates and scans a focused beam individually over the MEM devices, causing the secondary electrons to be emitted therefrom, such that the MEM devices each enter on of these states. In one specific embodiment of the invention, the apparatus may be employed in the context of a communication-switching network. Each MEM device may correspond to a single communication optic that is switched in accordance with the state of the MEM device. Other applications are also amenable to embodiments of the invention.

The display elements that have been described can therefore be more generally considered light valves in one embodiment of the invention. The light valves may be MEM devices. The light valves may include a support and a reflective membrane, such as a hinged mirror or other mirror-type membrane. The reflective membrane is situated on the support. The reflective membrane is capable of differently reflecting light in accordance with secondary electrons emitted therefrom. In the case of a display device, this light is reflected to form a projected image in accordance with display information. The image may be a black-and-white image, a grayscale image of one color, such as a black, as well as a color image. In other embodiments of the invention, the light may be reflected for other purposes and to perform other functionalities. For instance, in the case of a communication-switching network, the light corresponds to communication optics, each communication optic having a corresponding light valve and switched in accordance with the state of the light valve. Other applications are also amenable to embodiments of the invention.

Furthermore, it is noted that the display elements in at least some embodiments of the invention each have a reflective membrane that tilts to modulate the light incident thereto, instead of, for instance, deforming. That is, the display elements are non-deformable, or tiltable display elements. That the display elements are non-deformable mean that they maintain their shape, and individual components thereof do not bend. For instance, the reflective membrane 406 of FIG. 4A tilts, but maintains its shape while tilting. As another example, the support 404 of FIG. 4C tilts, but maintains its shape while tilting. That is, the shape of the membrane 406 and the support 404 do not deform into a different shape.

Additionally, it is noted that the charge is induced on the display elements via the focused beam generated by the focused beam source. This is as compared to other approaches for causing the display elements to be charged, such as by charging the display elements via a complementary metal-oxide semiconductor (CMOS) circuit, or other type of metal-oxide semiconductor (MOS) circuit, or other type of circuit physically connected thereto.

Therefore, it is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

What is claimed is:

1. An apparatus comprising:
   a plurality of micro-electromechanical (MEM) devices, each MEM device having a plurality of different states based on a charge induced thereon;
   a charge source to induce the charge thereon such that the plurality of MEM devices each enter one of the different states thereof: and,
   at least one discharge path for the plurality of MEM devices along which the charge induced thereon is dischargeable.

2. The apparatus of claim 1, wherein the charge source is a focused beam source.

3. The apparatus of claim 2, wherein each MEM device has more than two different states based on a number of electrons emitted therefrom, and a focused beam is scanned individually over the plurality of MEM devices to cause the electrons to be emitted from the plurality of MEM devices such that each MEM device enters one of the different states thereof.

4. The apparatus of claim 2, wherein each MEM device has more than two different states based on a number of primary electrons placed thereon, and a focused beam is scanned individually over the plurality of MEM devices to emit the primary electrons onto the plurality of MEM devices such that each MEM device enters one of the different states thereof.

5. The apparatus of claim 2, further comprising:
   a cathode-ray tube within which the focused beam source is situated; and, a plate situated within the cathode-ray tube and against which the plurality of MEM devices are situated.

6. The apparatus of claim 5, wherein the cathode-ray tube has a tapered end and a wide end, the plate situated at the wide end, and the focused beam source situated at the tapered end, the plurality of MEM devices disposed towards the focused beam source.

7. The apparatus of claim 5, wherein a focused beam scanned individually over the plurality of MEM devices induces the charge on each MEM device and an opposite mirror charge on the plate, such that an attractive force is developed between the MEM device and the plate.

8. The apparatus of claim 5, wherein the plurality of MEM devices comprises a plurality of mirror-type MEM devices, each MEM device capable of controlling light intensity reflected thereby based on an angle of reflection of a mirror of the MEM device.

9. The apparatus of claim 8, wherein the mirror of each MEM device of the plurality of mirror-type MEM devices is a hinged mirror, the MEM device having a default state in which the hinged mirror is parallel to the plate, such that the charge induced on the MEM device causes the hinged mirror to tilt relative to the plate to enter one of one or more different states other than the default state.

10. The apparatus of claim 8, wherein the mirror of each MEM device of the plurality of mirror-type MEM devices is a hinged mirror, the MEM device having a default state in which the hinged mirror is parallel to the plate, such that the charge induced on the MEM device causes the hinged mirror to tilt towards the plate to enter one of one or more different states other than the default state.

11. The apparatus of claim 2, wherein the focused beam source is a focused primary beam source.

12. The apparatus of claim 2, wherein the focused beam source is a focused electron beam source.

13. The apparatus of claim 12, wherein the plurality of MEM devices comprises a plurality of mirror-type MEM devices, each MEM device capable of controlling light intensity reflected thereby based on an angle of reflection of a mirror of the MEM device.

14. The apparatus of claim 13, wherein the mirror of each MEM device of the plurality of mirror-type MEM devices is a hinged mirror, the MEM device having a default state in which the hinged mirror is in one state, such that the charge induced on the MEM device causes the hinged mirror to tilt relative to the plate to enter one of the plurality of different states other than the default state.

15. The apparatus of claim 1, wherein the at least one discharge path comprises at least one of: a resistive element, a plate, and a switch.

16. An apparatus comprising:
a plurality of tiltable micro-electromechanical (MEM) devices, each MEM device having a plurality of different states based on a charge induced thereon; and,
a focused beam source to scan a focused beam individually over the plurality of MEM devices to induce the charge thereon such that the plurality of MEM devices each enter one of the different states thereof.

17. The apparatus of claim 16, wherein the plurality of tiltable MEM devices each tilt based on the charge thereon, and return to a default state upon the charge discharging therefrom automatically.

18. The apparatus of claim 16, wherein each MEM device has the plurality of different states based on a number of electrons emitted therefrom, and the focused beam is scanned individually over the plurality of MEM devices to cause the electrons to be emitted from the plurality of MEM devices such that each MEM device enters one of the different states thereof.

19. The apparatus of claim 16, further comprising:
a cathode-ray tube within which the focused beam source is situated; and,
a plate situated within the cathode-ray tube and against which the plurality of MEM devices are situated.

20. The apparatus of claim 19, wherein the focused beam scanned individually over the plurality of MEM devices induces the charge on each MEM device and an opposite mirror charge on the plate, such that an attractive force is developed between the MEM device and the plate.

21. The apparatus of claim 19, wherein the plurality of MEM devices comprises a plurality of mirror-type MEM devices, each MEM device capable of controlling light intensity reflected thereby based on an angle of reflection of a mirror of the MEM device.

22. An apparatus comprising:
a plurality of delay-tilt micro-electromechanical (MEM) devices, each MEM device tilting upon a charge being induced thereon, for a length of time corresponding to an amount of the charge, and returning to a default state upon the charging discharging therefrom automatically; and,
a focused beam source to scan a focused beam individually over the plurality of MEM devices to induce the charge thereon such that the plurality of MEM devices each enter one of the different states thereof.

23. The apparatus of claim 22, wherein each MEM device has more than two different states based on a number of electrons emitted therefrom, and the focused beam is scanned individually over the plurality of MEM devices to cause the electrons to be emitted from the plurality of MEM devices such that each MEM device enters one of the different states thereof.

24. The apparatus of claim 22, further comprising:
a cathode-ray tube within which the focused beam source is situated; and,
a plate situated within the cathode-ray tube and against which the plurality of MEM devices are situated.

25. The apparatus of claim 24, wherein the focused beam scanned individually over the plurality of MEM devices induces the charge on each MEM device and an opposite mirror charge on the plate, such that an attractive force is developed between the MEM device and the plate.

26. The apparatus of claim 24, wherein the plurality of MEM devices comprises a plurality of mirror-type MEM devices, each MEM device capable of controlling light intensity reflected thereby based on an angle of reflection of a mirror of the MEM device.

27. The apparatus of claim 22, wherein the focused beam source is a focused primary beam source.

28. The apparatus of claim 22, wherein the focused beam source is a focused electron beam source.

29. A display device comprising:
a plurality of micro-electromechanical (MEM) devices, each MEM device having more than two display states based on electrons emitted from the MEM device;
a focused beam source to scan a focused beam individually over the plurality of MEM devices and cause the electrons to be emitted therefrom in accordance with display information such that the plurality of MEM devices each enter one of the display states thereof; and,
at least one light source to project light towards the plurality of MEM devices, the plurality of MEM devices reflecting the light to result in a displayed image.

30. The display device of claim 29, wherein each MEM device has the plurality of different display states based on a number of electrons emitted therefrom, and the focused beam is scanned individually over the plurality of MEM devices to cause the electrons to be emitted from the plurality of MEM devices such that each MEM device enters one of the different display states thereof.

31. The display device of claim 29, further comprising:
a cathode-ray tube within which the focused beam source is situated; and,
a plate situated within the cathode-ray tube and against which the plurality of MEM devices are situated.

32. The display device of claim 31, wherein the focused beam scanned individually over the plurality of MEM devices induces the charge on each MEM device and an opposite mirror charge on the plate, such that an attractive force is developed between the MEM device and the plate.

33. The display device of claim 31, wherein the cathode-ray tube has a tapered end and a wide end, the plate situated at the wide end, and the focused beam source situated at the tapered end, the plurality of MEM devices disposed towards the focused beam source.

34. The display device of claim 33, wherein the plate has a first side deposed towards the focused beam source, and against which the plurality of MEM devices are situated, and a second side opposite to the first side.

35. The display device of claim 34, wherein the at least one light source is to project the light towards the second side of the plate.

36. The display device of claim 31, wherein the plurality of MEM devices comprises a plurality of mirror-type MEM devices, each MEM device capable of controlling light intensity reflected thereby based on an angle of reflection of a mirror of the MEM device.

37. The display device of claim 36, wherein the mirror of each MEM device of the plurality of mirror-type MEM devices is a hinged mirror, the MEM device having a default display state in which the hinged mirror is parallel to the plate, such that inducement of the charge on the MEM device causes the hinged mirror to tilt relative to the plate to enter one of one or more different display states other than the default display state.

38. The display device of claim 29, wherein the focused beam source is a focused electron beam source.

39. A display device comprising:
means for emitting electrons to enter one of a plurality of different display states;
means for scanning a focused beam over the means for emitting electrons to cause the electrons to be emitted therefrom in accordance with display information such that the means for emitting electrons enters one of the plurality of display states thereof; and,
means for projecting light towards the means for emitting electrons, the means for emitting electrons reflecting the light to result in a displayed image.

40. The display device of claim 39, wherein the means for emitting electrons is capable of controlling light intensity reflected thereby based on an angle of reflection thereof.

41. A light valve comprising:
a support; and,
a reflective membrane substantially situated on an end of the support, the reflective membrane capable of differently reflecting light in accordance with electrons emitted therefrom.

42. The light valve of claim 41, wherein the reflective membrane has a default position at least substantially perpendicular to the support, such that the reflective membrane is said to be in one of an off state and not reflecting light and an on state and reflecting light.

43. The light valve of claim 42, wherein the reflective membrane further has an activated position non-perpendicular to the support, such that the reflective membrane is said to be in the other of the off state and the on state.

44. The light valve of claim 42, wherein the reflective membrane further has a plurality of activated positions at different angles to the support, such that in each activated position the reflective membrane is said to be in an on state and is reflecting a different intensity of light.

45. The light valve of claim 41, wherein the reflective membrane tilts on the support in accordance with the electrons being emitted therefrom to differently reflect the light.

46. The light valve of claim 41, wherein the support tilts in accordance with the electrons being emitted therefrom to differently reflect the light.

47. The light valve of claim 45, wherein the reflective membrane is a hinged mirror.

48. The light valve of claim 41, wherein the light valve corresponds to a pixel of a display device.

49. The light valve of claim 41, wherein the light valve corresponds to a sub-pixel of a pixel of a display device.

50. The light valve of claim 41, wherein the light valve is a micro-electromechanical (MEM) device.

51. A display element for a display device comprising:
a support; and,
means for rotating in relation to the support to differently reflect projected light in accordance with electrons emitted therefrom.

52. The display element of claim 51, wherein the display element corresponds to a pixel of the display device.

53. The display element of claim 51, wherein the display element corresponds to a sub-pixel of a pixel of the display device.

54. The display element of claim 51, wherein the display element is a micro-electromechanical (MEM) device.

55. A method comprising:
projecting at least one light source towards a plurality of micro-electromechanical (MEM) devices to result in a displayed image; and,
scanning a focused beam individually over the plurality of MEM devices to cause electrons to be emitted therefrom in accordance with display information, such that the plurality of MEM devices each enter one of more than two display states.

56. The method of claim 55, further comprising repeating scanning the focused beam individually over the plurality of MEM devices for each frame of a plurality of frames.

57. The method of claim 56, further comprising, after each frame of the plurality of frames, setting the plurality of MEM devices each to a default state of the plurality of display states.

58. A method comprising:
providing a cathode-ray tube having a tapered end and a wide end;
disposing a focused beam source at the tapered end of the cathode-ray tube;
disposing a plate at the wide end of the cathode-ray tube;
disposing a plurality of micro-electromechanical (MEM) devices against the plate, the plurality of MEM devices capable of having electrons emitted therefrom in response to being individually scanned by the focused beam source to each enter one of more than two different display states, and capable of reflecting light to result in a displayed image in accordance with a display state entered; and, situating at least one light source capable of projecting light towards the plurality of MEM devices that is reflected thereby.

59. The method of claim 58, wherein disposing the focused beam source comprises disposing a focused electron beam source at the tapered end of the cathode-ray tube.

60. The method of claim 58, wherein disposing the plurality of MEM devices against the plate comprises disposing a plurality of mirror-type MEM devices against the plate, each MEM device capable of controlling light intensity reflected thereby based on an angle of reflection of a mirror of the MEM device.

61. The method of claim 60, wherein disposing the plurality of mirror-type MEM devices against the plate comprises disposing a plurality of MEM devices having hinged mirrors, the hinged mirror of each MEM device capable of tilting away from and towards the plate.

* * * * *

UNITED STATES PATENT AND TRADEMARK OFFICE
CERTIFICATE OF CORRECTION

PATENT NO. : 6,943,933 B2
APPLICATION NO. : 10/743603
DATED : September 13, 2005
INVENTOR(S) : Radominski et al.

It is certified that error appears in the above-identified patent and that said Letters Patent is hereby corrected as shown below:

Col. 10 (line 45), delete "thereof:" and insert therefor --thereof;--.

Signed and Sealed this

Fifteenth Day of August, 2006

JON W. DUDAS
*Director of the United States Patent and Trademark Office*